(12) United States Patent
Ishii

(10) Patent No.: US 6,896,756 B2
(45) Date of Patent: May 24, 2005

(54) MANUFACTURING METHOD FOR RESIN FORMED ELEMENT

(75) Inventor: Naoto Ishii, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 303 days.

(21) Appl. No.: 10/153,744

(22) Filed: May 24, 2002

(65) Prior Publication Data

US 2002/0175450 A1 Nov. 28, 2002

(30) Foreign Application Priority Data

May 28, 2001 (JP) ........................................ 2001-159529

(51) Int. Cl.[7] .......................... B29C 45/14; B29C 45/16
(52) U.S. Cl. .................... 156/219; 156/247; 156/275.5; 156/275.7; 156/277; 156/344
(58) Field of Search ................................ 156/209, 219, 156/247, 261, 272.2, 275.5, 275.7, 277, 290, 291, 295, 344; 264/132, 271.1, 274

(56) References Cited

U.S. PATENT DOCUMENTS 5,389,172 A * 2/1995 Kobayashi et al. ......... 156/155
5,902,433 A * 5/1999 Becher et al. ............... 156/209
6,325,880 B1 * 12/2001 Yamashita et al. .......... 156/209
6,514,364 B2 * 2/2003 Miura et al. ............. 156/89.12

FOREIGN PATENT DOCUMENTS

JP          5-57864         3/1993

* cited by examiner

Primary Examiner—John T. Haran
(74) Attorney, Agent, or Firm—Sughrue Mion, PLLC

(57) ABSTRACT

A manufacturing method for a resin formed element capable of exhibiting an advanced design quality while reducing the manufacturing cost is provided. The method comprises the steps of printing a pattern on a reverse side of a thermoplastic film to form a printed pattern layer, printing and curing an ultraviolet curable or thermosetting resin in part of the surface of the thermoplastic film to form an ultraviolet cured or thermoset resin layer, burying this ultraviolet cured or thermoset resin layer in the thermoplastic film, and forming a resin base material from the printed pattern layer side of the laminated element to adhere and integrate, so as to produce a difference in distance from the surface between the region corresponding to the ultraviolet cured or thermoset resin layer of the printed pattern layer and other region, and finally peeling the ultraviolet cured or thermoset resin layer from the thermoplastic film.

4 Claims, 2 Drawing Sheets

Resin injection

MANUFACTURING METHOD FOR RESIN FORMED ELEMENT

FIELD OF THE INVENTION

The present invention relates to a manufacturing method for a resin formed element having an advanced design quality, and more particularly, relates to a manufacturing method for a resin formed element preferably used in interior and exterior panels of vehicles, ships, and aircraft, in building materials, in electric household appliances, in furniture, in wallpaper, in religious ornaments and decorations, in nameplates, in containers, in clothes, in shoes, in bags, in telephone cards, in credit cards, in IC cards, etc.

BACKGROUND ART

To manufacture a resin formed element having a design quality, for example, a pattern is formed on a plastic base material, a paint resin liquid is poured on the surface thereof and is cured to obtain a resin formed element. Alternatively, using a die having a shape corresponding to desired undulations, a resin formed element having an undulated surface is obtained, or to apply an advance design quality, a resin formed element is obtained by embossing the resin surface by using an embossing film, or a resin formed element is further processed by wiping printing. Japanese Patent Application Laid-open No. 5-57864 discloses a resin formed element which is excellent in design quality by emphasizing the undulation feel.

DISCLOSURE OF THE INVENTION

However, the conventional art had its own problems, such as lack of solid feel or genuine feel, complicated manufacturing processes in order to obtain a solid feel, and high manufacturing cost. In light of these problems, it is therefore an object of the invention to provide a manufacturing method for a resin formed element capable of exhibiting an advanced design quality while reducing the manufacturing cost.

The manufacturing method for a resin formed element of the invention comprises a step of printing a pattern on a reverse side of a thermoplastic film to form a printed pattern layer, a step of printing and curing an ultraviolet curable or thermosetting resin in part of the surface of the thermoplastic film to form an ultraviolet cured or thermoset resin layer, a step of burying this ultraviolet cured or thermoset resin layer in the thermoplastic film, and forming a resin base material from the printed pattern layer side of the laminated element to adhere and integrate, so as to produce a difference in distance from the surface between the region corresponding to the ultraviolet cured or thermoset resin layer of the printed pattern layer and other regions, and a step of peeling the ultraviolet cured or thermoset resin layer from the thermoplastic film.

According to the manufacturing method for a resin formed element of the invention, the printed pattern layer is provided on the reverse side of the thermoplastic film, and the ultraviolet cured or thermoset resin layer is provided in part of the surface of the thermoplastic film, and by forming a resin base material on this printed film from the print patterned side, a difference is caused in the distance from the surface between the region corresponding to the ultraviolet cured or thermoset resin layer of the printed pattern layer and other regions, that is, a partial step difference is formed on this printed pattern layer, and therefore the appearance of high design quality having a solid feel and a feeling of depth is obtained, and moreover the ultraviolet cured or thermoset resin layer buried in the flexible thermoplastic film by the heat in the forming process of the resin base material is peeled off after curing of the thermoplastic resin, so that undulations may be formed on the surface of the resin formed element by using a flat die, instead of a conventional undulated die.

In other aspect of the invention, the manufacturing method for a resin formed element comprises a step of printing a pattern on a reverse side of a thermoplastic film to form a printed pattern layer, a step of adhering a stripping film on the surface of this thermoplastic film, a step of printing and curing an ultraviolet curable or thermosetting resin in part of the surface of the stripping film to form an ultraviolet cured or thermoset resin layer, a step of burying this ultraviolet cured or thermoset resin layer in the thermoplastic film, and forming a resin base material from the printed pattern layer side of the laminated element to adhere and integrate, so as to produce a difference in distance from the surface between the region corresponding to the ultraviolet cured or thermoset resin layer of the printed pattern layer and other regions, and a step of peeling the ultraviolet cured or thermoset resin layer from the thermoplastic film.

According to this aspect, since the stripping film is provided before the step of forming the ultraviolet cured or thermoset resin layer, as compared with the preceding aspect, the ultraviolet cured or thermoset resin layer can be peeled more easily, and the productivity is high. Incidentally, the same effects are obtained if the sequence is exchanged between the step of printing a pattern on a reverse side of a thermoplastic film to form a printed pattern layer and the step of adhering a stripping film on the surface of this thermoplastic film.

The ultraviolet cured or thermoset resin layer is usually small in elongation in heating and forming processes, and cracking of printing ink is likely to occur; however, in the invention, since the region free from this layer is selectively stretched, cracking of printing ink is prevented, and the formed element may be manufactured not only in a flat plate, but also in a free shape, such as a U-shape or bracket shape.

BEST MODE FOR CARRYING OUT THE INVENTION

In the following, a resin formed element of the invention and a manufacturing method therefor will be explained in the sequence of its steps.

Forming Step of Printed Pattern Layer

As a thermoplastic film, any transparent and printable film may be used, and particularly preferred examples include acrylic, polyethylene terephthalate (PET), polyethylene naphthalate (PEN), polyvinylidene fluoride (PVDF), polystyrene (PS), polycarbonate (PC), polypropylene (PP), polyethylene (PE), etc.

The printed pattern layer is not particularly limited, and pictures, patterns and characters can be printed. A base color of patterns of the printed pattern layer is preferred to be a color of high luminance using aluminum pigment or the like, so that an excellent contrast will be obtained.

Figure 1A:
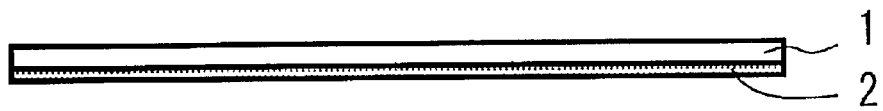
FIGS. 1A to E are diagrams explaining steps of a manufacturing method for a resin formed element of the invention.

The forming method for the printed pattern layer includes known techniques such as gravure printing, offset printing, and screen printing, and a printed pattern layer 2 is printed and formed on a reverse side of a thermoplastic film 1 as shown in FIG. 1A.

Forming Step of Ultraviolet Cured or Thermoset Resin Layer

Figure 1B:
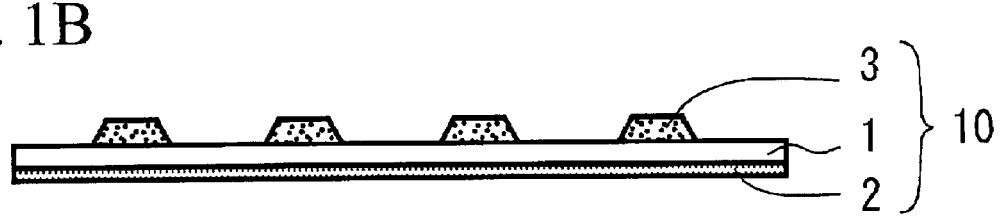

The ultraviolet curable or thermosetting resin is any ordinary known resin, including formaldehyde resin, amino resin, phenol resin, epoxy resin, polyurethane resin, urea resin, melamine resin, alkyd resin, unsaturated polyester, etc. The ultraviolet curable or thermosetting resin 3 can be printed in a desired pattern on the surface of the thermoplastic film 1, as shown in FIG. 1B, by screen printing, gravure printing, etc., and then the ultraviolet curable or thermosetting resin 3 is cured properly by ultraviolet light or heat to prepare a printed film 10.

Step of Forming Resin base Material and Adhering and Integrating Printed Film

A resin base material may include acrylonitrile-butadiene-styrene copolymer (ABS), polycarbonate (PC), polypropylene (PP), polyphenyl ether (PPE), polystyrene (PS), and polyvinyl chloride (PVC), which may be used either alone or in combination of a plurality thereof.

The forming method for the resin base material in the invention includes vacuum forming, blow forming, injection forming with simultaneous decorative forming, and extrusion forming with simultaneous adhering. Among them, the resin base material forming method by injection forming with simultaneous decorative forming is particularly preferable in the invention.

At the adhering and integrating step of the invention, by heating the printed film preliminarily to soften the thermoplastic resin, the resin formed element of the invention can be preferably manufactured. The heating time and heating temperature of the printed film vary with the thermoplastic resin, but when using an ordinary thermoplastic resin, they are preferred to be in a range of 150 to 550° C., and 1 to 60 seconds.

Figure 1C:
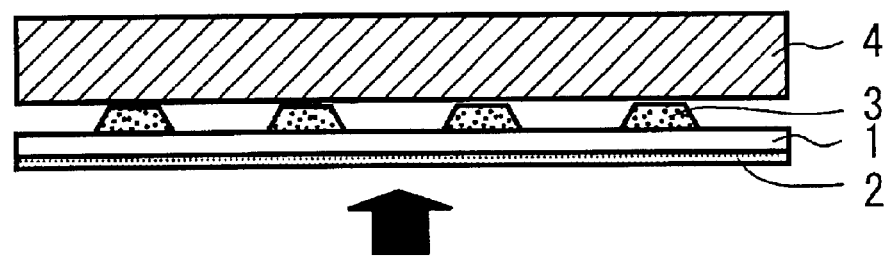

In the adhering and integrating method of the invention, first, as shown in FIG. 1C, the printing surface of the ultraviolet cured or thermoset resin layer 3 on the preheated printed film 10 is pressed against the die or roller 4. The resin base material 5 is formed by the above forming method from the printed pattern layer 2 side of the printed film 10. By the pressure of forming the resin base material 5, the entire printed film 10 is pressed against the die or roller 4, and the ultraviolet cured or thermoset resin layer 3 is completely buried in the flexible thermoplastic film 1 by the heat of preheating and forming, and the printed pattern layer 2 partly varying in distance from the surface is formed at the same time.

Figure 1D:
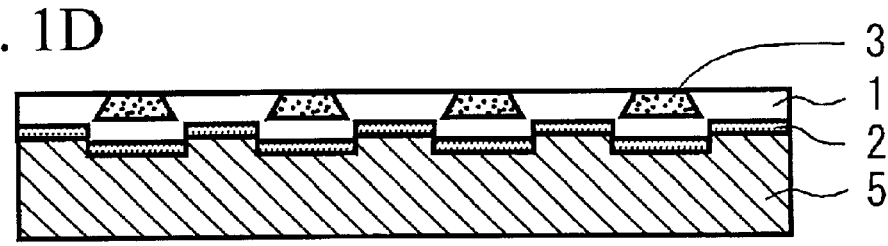

The shape of the pattern layer 2 is as shown in FIG. 1D; that is, the thickness of the printed film 10 in the region where the ultraviolet cured or thermoset resin layer 3 is not provided is smaller than the thickness thereof in the region where the ultraviolet cured or thermoset resin layer 3 is provided, and therefore when the printed film 10 is pressed to the die or roller 4, the region where the ultraviolet cured or thermoset resin layer 3 is not provided is brought closer to the die or roller 4 than the printed pattern layer 2 in the region where the ultraviolet cured or thermoset resin layer 3 is provided, and a partial step difference depending on presence or absence of the ultraviolet cured or thermoset resin layer 3 is produced in the printed pattern layer 2, so that its shape is determined.

Peeling Step of Ultraviolet Cured or Thermoset Resin Layer

Figure 1E:
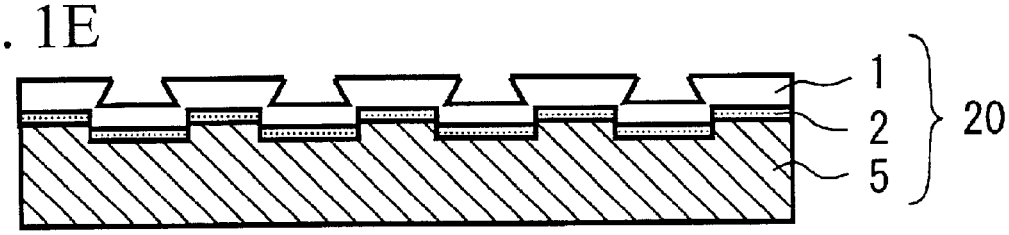

Next, the ultraviolet cured or thermoset resin layer 3 is peeled off mechanically from the surface of the printed film 10 by frictional force by using, for example, rubber, etc., and undulations are formed also on the surface of the thermoplastic film 1, as shown in FIG. 1E, so that a resin formed element 20 of high design quality of the invention is manufactured.

Figure 2:
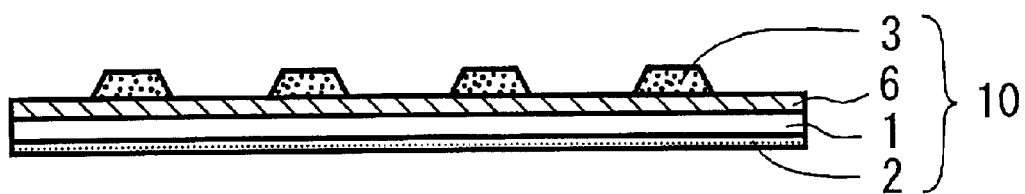
FIG. 2 is a diagram showing a printing film having an ultraviolet cured or thermoset resin layer in the manufacturing method for a resin formed element of the invention using a stripping film.

Furthermore, in the invention, a stripping film may also be used to facilitate the peeling step. As shown in FIG. 2, before the step of forming the ultraviolet cured or thermoset resin layer, for example, a stripping film 6 is adhered to the surface of the thermoplastic film 1 by way of a weak adhesive layer, and the ultraviolet cured or thermoset resin layer 3 is formed on this stripping film by printing or the like, and the resin base material is formed in the same manner as in the manufacturing method above, and the printed film 10 is adhered and integrated. Afterwards, the stripping film 6 is removed from the printed film 10 together with the ultraviolet cured or thermoset resin layer 3. The stripping film may be made of the same material as the thermoplastic film, but it is preferred to select from materials that can be easily peeled off from the thermoplastic film after forming the resin base material and adhere firmly to the ultraviolet cured or thermoset resin layer.

EXAMPLES

In the following, the invention will be specifically explained by Examples.

Example 1

First, on a reverse side of an acrylic film (thermoplastic film), a printed pattern layer of a metallic color was formed by gravure printing, using aluminum pigment. Next, 660 parts of isophorone diisocyanate, 440 parts of tetrahydrofurfuryl acrylate, and 300 parts of polyethylene glycol diacrylate were mixed, and further while adding 1200 parts of ring opening reaction product of trimethylol propane and epsilon-caprolactone, reaction was performed by stirring at 70° C., and after confirming decrease of isocyanate groups, 350 parts of 2-hydroxyethyl acrylate was charged, and the reaction was continued at 70° C. until isocyanate groups were completely eliminated, and urethane acrylate was synthesized. The mixture of this urethane acrylate and 2-hydroxy-2-methyl-1-phenylpropan-1-one at a ratio of 97:3 by weight, was screen printed on the surface of the acrylic film, and an ultraviolet cured resin layer was formed by irradiation with ultraviolet light, and a printed film was fabricated.

The acrylic film was softened by heating to 360 to 390° C. for about 10 seconds, and the printed film was formed in a vacuum so that the printed surface of the ultraviolet cured resin layer could be pressed tightly to the die. From the printed pattern layer side of the printed film, an acrylonitrile-butadiene-styrene copolymer was formed by injection. At this time, the cylinder temperature was 240° C., the injection pressure was 1800 kg/cm², and the holding pressure was 1400 kg/cm² (2 seconds), and 1000 kg/cm² (2 seconds). The formed element was cooled to room temperature, and the acrylic film was hardened, and the ultraviolet cured resin layer was peeled off by rubbing with rubber, and a resin formed element of the invention was manufactured.

Figure 3:
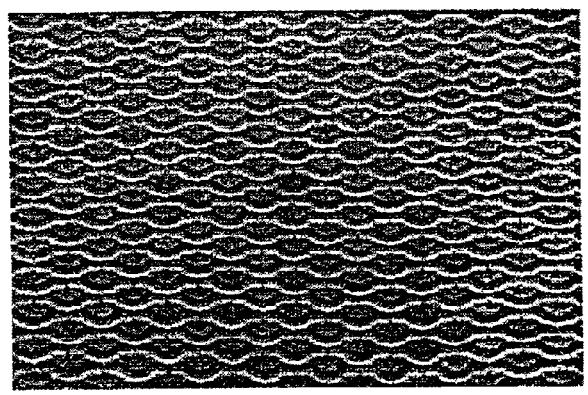
FIG. 3 shows an embodiment of a resin formed element of the invention.
Figure 4:
FIG. 4 is a sectional view schematically showing a region in an embodiment of a resin formed element of the invention.

FIG. 3 shows an example of the resin formed element of the invention manufactured in the above procedure, and FIG. 4 is a schematic diagram of a sectional view of a part of the resin formed element in FIG. 3. As shown in FIG. 3 and FIG. 4, in the resin formed element of the invention, the regions where the ultraviolet cured resin layer is peeled off form concave parts, and the regions where the ultraviolet cured resin layer is not provided form convex parts (wavy line portions), and thus the surface shape is formed. In the printed pattern layer of the resin formed element of the invention, since partial undulations corresponding to the surface shape are formed, an advanced design quality such as solid feel and feeling of depth which is not expressed by the surface shape alone can be provided.

What is claimed is:

1. A manufacturing method for a resin formed element comprising the steps of:

printing a pattern on a first surface of a thermoplastic film to form a printed pattern layer;

printing and curing an ultraviolet curable or thermosetting resin on part of a second surface of the thermoplastic film to form an ultraviolet cured or thermoset resin layer;

forming a resin base material on the printed pattern layer;

burying said ultraviolet cured or thermoset resin layer in the thermoplastic film, thereby adhering and integrating the resin base material to the printed pattern layer to form a laminated element; and peeling the ultraviolet cured or thermoset resin layer from the thermoplastic film such that there is a difference in thickness in the laminated element such that in a region where the ultraviolet cured or thermoset resin layer was previously present the thickness is smaller than the region where the ultraviolet cured or thermoset resin layer was not previously present.

2. The manufacturing method for the resin formed element of claim 1, wherein the forming method of the resin base material is any one of vacuum forming, blow forming, injection forming with simultaneous decorative forming, and extrusion forming with simultaneous adhering.

3. A manufacturing method for a resin formed element comprising the steps of:

printing a pattern on a first surface of a thermoplastic film to form a printed pattern layer;

adhering a stripping film on a second surface of said thermoplastic film;

printing and curing an ultraviolet curable or thermosetting resin on part of the stripping film to form an ultraviolet cured or thermoset resin layer;

forming a resin base material on the printed pattern layer;

burying said ultraviolet cured or thermoset resin layer in the thermoplastic film, thereby adhering and integrating the resin base material to the printed pattern layer to form a laminated element; and peeling the stripping film and the ultraviolet cured or thermoset resin layer from the thermoplastic film such that there is a difference in thickness in the laminated element such that in a region where the ultraviolet cured or thermoset resin layer was previously present the thickness is smaller than the region where the ultraviolet cured or thermoset resin layer was not previously present.

4. The manufacturing method for the resin formed element of claim 3, wherein the forming method of the resin base material is any one of vacuum forming, blow forming, injection forming with simultaneous decorative forming, and extrusion forming with simultaneous adhering.

* * * * *